(12) United States Patent
Newman

(10) Patent No.: US 10,074,846 B2
(45) Date of Patent: Sep. 11, 2018

(54) BATTERY MODULE INCLUDING A WELDLESS BUSBAR HAVING AN INTEGRATED FUSIBLE LINK

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/394,935

(22) Filed: Dec. 30, 2016

(65) Prior Publication Data

US 2018/0083251 A1    Mar. 22, 2018

Related U.S. Application Data

(60) Provisional application No. 62/395,419, filed on Sep. 16, 2016.

(51) Int. Cl.
| | |
|---|---|
| *H01M 2/20* | (2006.01) |
| *H01M 2/02* | (2006.01) |
| *H01M 2/26* | (2006.01) |
| *H01M 2/30* | (2006.01) |
| *H01M 2/34* | (2006.01) |
| *H01M 2/10* | (2006.01) |
| *H01M 10/42* | (2006.01) |
| *B60L 11/18* | (2006.01) |

(52) U.S. Cl.
CPC ......... *H01M 2/206* (2013.01); *B60L 11/1861* (2013.01); *B60L 11/1877* (2013.01); *H01M 2/024* (2013.01); *H01M 2/1077* (2013.01); *H01M 2/26* (2013.01); *H01M 2/305* (2013.01); *H01M 2/348* (2013.01); *H01M 10/425* (2013.01); *B60Y 2400/112* (2013.01); *B60Y 2410/114* (2013.01); *H01M 2010/4271* (2013.01); *H01M 2220/20* (2013.01)

(58) Field of Classification Search
CPC ........ H01M 2/20; H01M 2/202; H01M 2/204; H01M 2/206; H01M 2/22; H01M 2/24; H01M 2/26; H01M 2/263; H01M 2/266
See application file for complete search history.

(56) References Cited

U.S. PATENT DOCUMENTS

| | | | | |
|---|---|---|---|---|
| 2012/0164490 A1* | 6/2012 | Itoi | ....................... | H01M 2/105 429/7 |
| 2014/0255748 A1* | 9/2014 | Jan | ....................... | H01M 2/202 429/120 |

\* cited by examiner

*Primary Examiner* — Carlos Barcena
(74) *Attorney, Agent, or Firm* — Sheridan Ross P.C.

(57) ABSTRACT

A battery module includes a plurality of battery cells each configured to store an electric charge and a busbar interconnecting the plurality of battery cells. Each battery cell has a first end surface including a positive terminal, a second end surface, and a perimeter surface including a negative terminal. The busbar has a layered structure including a plurality of parallel-extending layers. The layers include a first conductive layer positioned on the first end surface and contacting each of the positive terminals of the plurality of battery cells, a second conductive layer positioned between the first and second end surfaces and contacting each of the negative terminals of the plurality of battery cells, and at least one isolating layer positioned between the first conductive layer and the second conductive layer. The at least one isolating layers holds the battery cells in position in at least a lateral direction.

20 Claims, 5 Drawing Sheets

BATTERY MODULE INCLUDING A WELDLESS BUSBAR HAVING AN INTEGRATED FUSIBLE LINK

PRIORITY CLAIM

This application claims priority under 35 U.S.C. § 119 to U.S. Provisional Application No. 62/395,419, filed on Sep. 16, 2016 which is expressly incorporated by reference herein in its entirety.

FIELD OF INVENTION

The present disclosure relates to a battery module, and, in particular, to a vehicle battery module including a weldless busbar having an integrated fusible link.

BACKGROUND

Electric vehicles use battery modules made up of hundreds of battery cells which individually store an electrical charge. The electrical energy from the battery cells is delivered to an electric motor for use in producing mechanical power to move the vehicle, as well as to auxiliary systems. The battery cells are interconnected in order to provide collective energy storage with sufficient voltage and current to power the relevant systems of the vehicle and provide a satisfactory range for the vehicle. Each battery cell has a positive and negative connection point which serve as the locations for the interconnection.

A common configuration for an electric vehicle battery module uses one or more busbars to connect the positive terminals to each other and one or more separate busbars to connect the negative terminals to each other. In this way, the busbars can create singular positive and negative terminals for a collection of battery cells in a battery module. This simplifies the battery module for connection to the electric motor.

Typically, busbars are connected to the terminals of the battery cells by mechanical means. For example, a plurality of conductive links or wires may be respectively welded to the positive and negative terminals of the battery cells, forming a connection chain which connects the battery cells. This welded configuration may be less than ideal in some situations, however, because it requires many weld points to be produced and for each to be functional and reliable. Moreover, the connection may not be strong enough to withstand relative movement between battery cells, resulting in the need for additional structure (e.g., a tight-fitting battery case) to hold the battery cells.

The present disclosure is directed to overcoming these and other problems of the prior art.

SUMMARY

In one aspect, the present disclosure is directed to a battery module. The battery module includes a plurality of battery cells each configured to store an electric charge and a busbar interconnecting the plurality of battery cells. Each battery cell includes a first end surface, a second end surface, a perimeter surface, a positive terminal and a negative terminal. The busbar includes a layered structure comprising a plurality of parallel-extending layers. The plurality of layers include a first conductive layer contacting each of the positive terminals of the plurality of battery cells, a second conductive layer contacting each of the negative terminals of the plurality of battery cells, and at least one isolating layer connected to each of the plurality of battery cells and holding the plurality of battery cells in position relative to each other in at least a lateral direction.

In another aspect, the present disclosure is directed to a battery module. The battery module includes a plurality of battery cells each configured to store an electric charge and a busbar interconnecting the plurality of battery cells. The battery module includes a first end surface including a positive terminal, a second end surface, and a perimeter surface including a negative terminal. The busbar includes a layered structure comprising a plurality of parallel-extending layers. The plurality of layers includes a first conductive layer positioned on the first end surface of the plurality of battery cells and contacting each of the positive terminals of the plurality of battery cells, a second conductive layer positioned between the first and second end surfaces and at least partially surrounding the perimeter surface and contacting each of the negative terminals of the plurality of battery cells, and at least one isolating layer positioned between the first conductive layer and the second conductive layer.

In yet another aspect the present disclosure is directed to a busbar. The busbar is configured to mechanically and electrically connect a plurality of battery cells which each include a first end surface including a positive terminal, a second end surface, and a perimeter surface including a negative terminal. The busbar includes a layered structure. The layered structure includes a first conductive layer positioned on the first end surfaces and contacting the positive terminals via an electrically-conductive adhesive, and a second conductive layer at least partially surrounding the perimeter surfaces and contacting each of the negative terminals of the plurality of battery cells via a contacting point surface which is configured to burn away when a threshold amount of current is present at the negative terminal. The layered structure further includes a first isolating layer positioned between the first conductive layer and the second conductive layer, a second isolating layer positioned on a side of the first conductive layer opposite the first isolating layer, and a third isolating layer positioned on a side of the second conductive layer opposite the first conductive layer. The first isolating layer, the second isolating layer, and the third isolating layer shield the first and second conductive layers and are configured to hold the plurality of battery cells in position relative to each other in a lateral and vertical direction.

BRIEF DESCRIPTION OF THE DRAWING(S)

DETAILED DESCRIPTION OF THE PREFERRED EMBODIMENT(S)

Electric vehicles typically include battery modules housing a plurality of battery cells. The present disclosure is directed to a busbar and a battery module having a busbar which interconnects the plurality of battery cells in a manner which does not use welding and which provides a mechanical hold for the battery cells. In addition, the busbar configuration includes an integrated fusible link between the battery cells and at least one of the conductive members of the busbar. The fusible link provides a protective feature in which an electrical connection to a battery cell is removed when a particular condition, such as a current value above a threshold, occurs.

The disclosed busbar includes a layered structure including conductive layers which interconnect the positive and negative terminals of the plurality of battery cells. The layered structure also includes one or more isolating layers which shield the conductive layers and are configured to hold the plurality of battery cells relative to each other in at least a lateral direction. In some embodiments, the layered structure includes a plurality of isolating layers which shield both sides of the conductive layers and also hold the plurality of battery cells in lateral and vertical directions.

Figure 1:
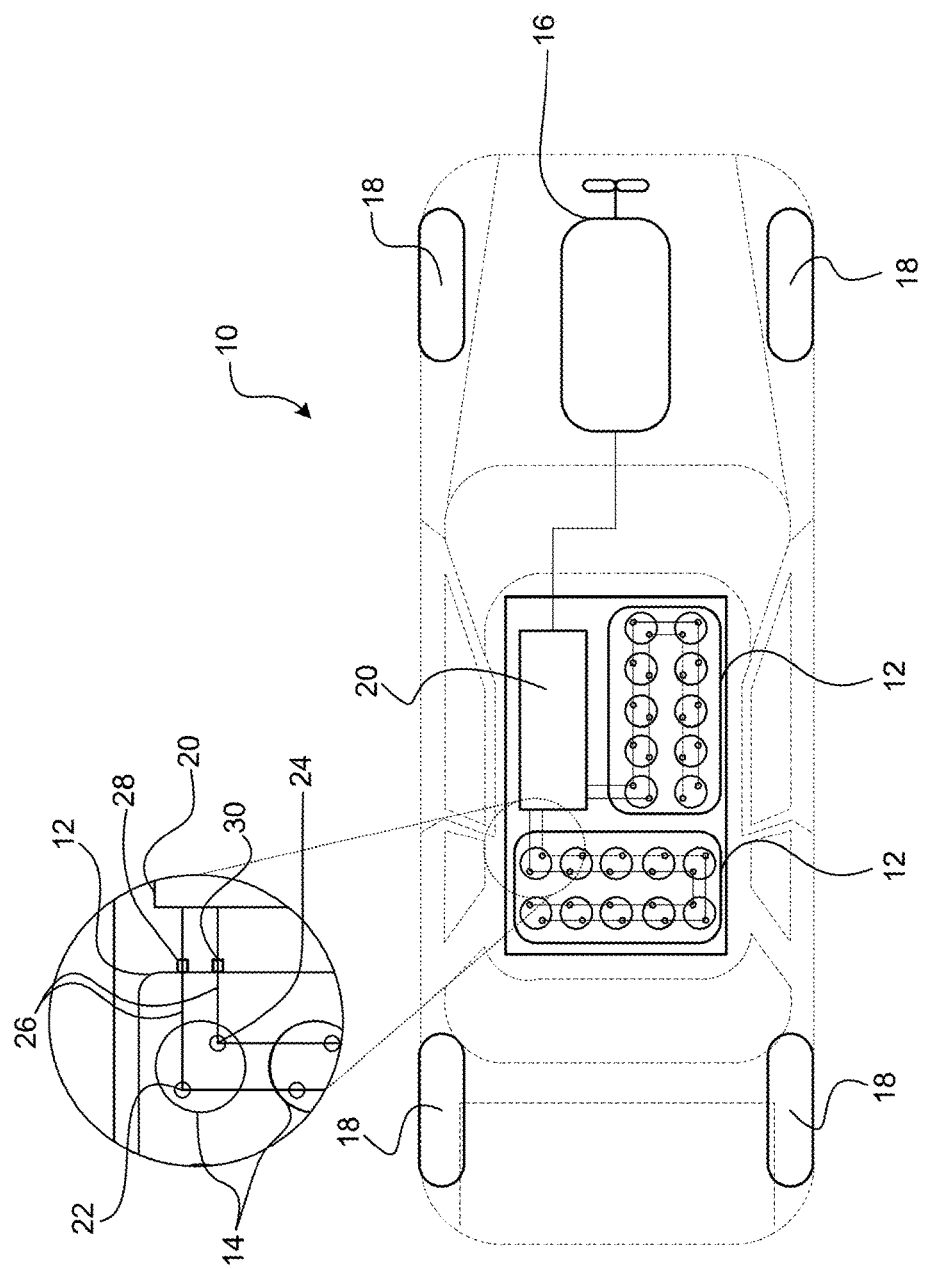
FIG. 1 is a top-view schematic illustration of an electric vehicle.

FIG. 1 is a schematic illustration of a vehicle 10. The vehicle 10 is preferably an electric vehicle which includes features which power the vehicle 10 via stored electrical energy. For example, the vehicle 10 may include one or more battery modules 12 including a plurality of battery cells 14. The battery modules 12 store electrical energy in the battery cells 14 and provide the electrical energy to an electric motor 16. The electric motor 16 is operably connected to a plurality of traction devices 18 (e.g., wheels and tires) in order to move the vehicle 10. The power system of the vehicle 10 may operate in a conventional manner in order to propel the vehicle 10 and power the auxiliary systems of the vehicle 10 via the battery modules 12.

For example, the vehicle 10 may further include a battery management system 20 electrically connected to the battery modules 12. The battery management system 20 is preferably a computing device including processing and memory components. The battery management system 20 is configured to control the battery modules 12, such as by regulating the amount of electrical energy delivered to the electric motor 16. In addition, the battery management system 20 may collect data regarding the status and/or performance of the battery modules 12, including state of charge, battery health, battery cell performance, etc. In addition, the battery management system 20 may allocate energy to other vehicle systems.

The plurality of battery cells 14, in some embodiments, may be any type of battery cell which is suitable for use in powering electric vehicle 10. For example, the battery cells 14 may be lithium-ion rechargeable batteries, or other electric vehicle battery cells known in the art. In an exemplary embodiment, each battery module 12 includes many battery cells 14, such as hundreds or even thousands of interconnected cells. In an exemplary embodiment, each battery cell 14 is a cylindrical battery cell, although other shapes and configurations are possible.

In an exemplary embodiment, each battery cell 14 includes a positive terminal 22 and a negative terminal 24. The positive and negative terminals 22, 24 are connection points for operably connecting the battery cells 14 to each other and to other components in the vehicle 10 (e.g., the battery management system 20). The positive and negative terminals 22, 24 may be embodied in a variety of manners, such as through metal contact points which are located in separate locations on each battery cell 14.

The plurality of battery cells 14 are connected to each other in a manner that allows the electrical energy stored in all of the cells 14 to be utilized, if necessary. For example, the plurality of battery cells 14 may be connected in parallel in order to increase the amount of current that can be provided as a cumulative battery module 14. In order to connect the battery cells 14 in parallel, the positive terminals 22 are connected to each other and, likewise, the negative terminals 24 are connected to each other. This effectively renders the battery module 12 as one larger battery cell, including an output voltage approximately equal to the voltage of each individual battery cell 14 and a cumulative output amperage rating which combines that of the plurality of battery cells 14.

The electrical connections between the battery cells 14 are provided through one or more busbars 26. The busbar 26 is an electrically conductive device which is configured to interconnect the positive and negative terminals 22, 24 of the plurality of battery cells 14. The busbar 26 allows electrical charge stored in the battery cells 14 to be delivered outside of the battery module 12 (i.e., discharging) and, in some embodiments, allows electrical charge to be restored to the plurality of battery cells 14 (i.e., recharging). Further, it should be understood that the busbar 26 may additionally allow for simultaneous transfer of data, such as between the battery cells 14 or related components (e.g., sensors, monitoring devices, etc.) and the battery management system 20.

In order for the battery module 12, with the interconnected battery cells 14, to provide the stored energy to the battery management system 20 (and/or other component of vehicle 10), for example, each battery module 12 may include a positive module terminal 28 and a negative module terminal 30. The module terminals 28, 30 serve as overall contact points for placing the battery module 12 into service (e.g., by electrically connecting to the battery management system 20, such as through a wire or additional busbar).

Figure 2:
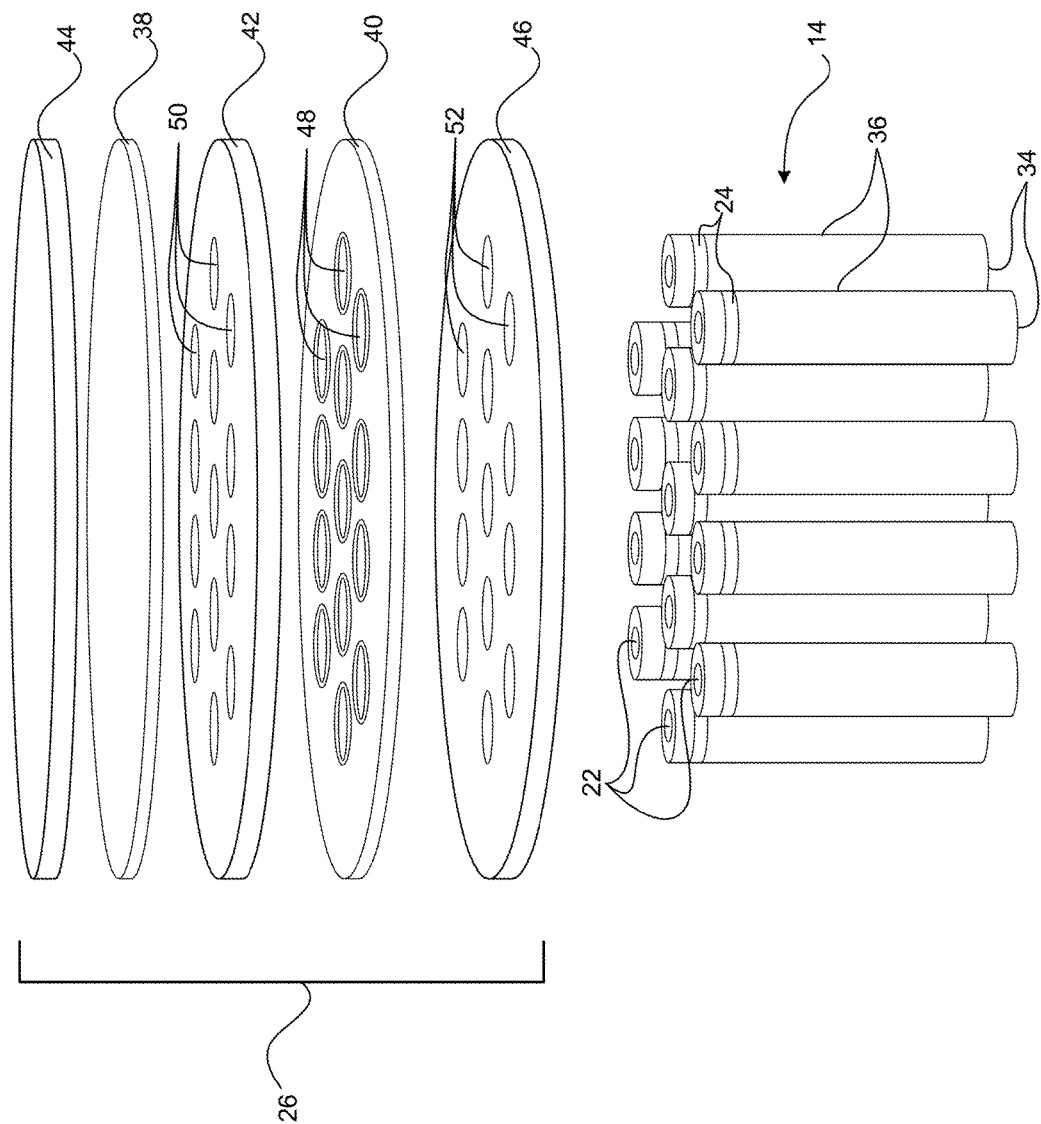
FIG. 2 is an exploded view of a battery module which may be used in conjunction with the electric vehicle of FIG. 1.
Figure 3:
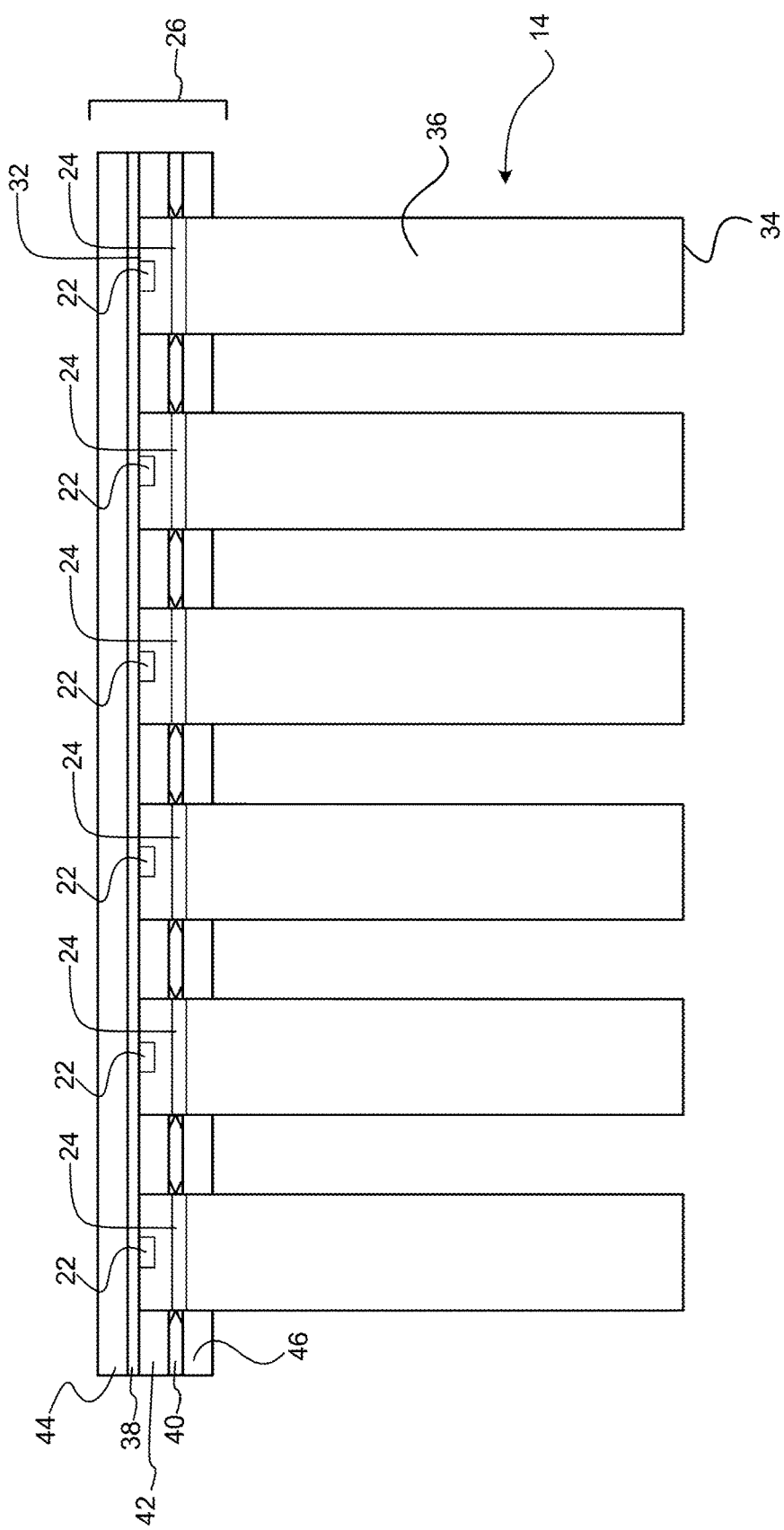
FIG. 3 is a side-view illustration of the battery module of FIG. 2.

FIGS. 2 and 3 further illustrate the battery module 12 according to one embodiment, including the plurality of battery cells 14 and the busbar 26. It should be understood that the illustrated embodiment is an example of a disclosed configuration, which may be implemented in any battery module having different shapes, sizes, and amount of components. For example, the disclosed embodiments may be implemented in a battery module including many more battery cells 14 than those shown.

Moreover, it should be understood that a battery module 12 consistent with the disclosed embodiments may include additional features other than those shown and/or may omit some features. For example, a battery module 12 may include a battery housing which encloses the battery cells 14, as well as other management and control components, such as sensors, processors, connectors, etc.

In an exemplary embodiment, the plurality of battery cells 14 are arranged side-by-side in a lateral direction L, with a longitudinal extent of each battery cell 14 extending in a vertical direction V, which is perpendicular to the lateral direction L. It should be understood that these directional terms are used for convention only and should not be considered limiting. In general, the lateral direction refers to a stacking direction of the plurality of battery cells 14 (e.g., the direction in which the cells are positioned next to each other) and the vertical direction is perpendicular to the lateral direction.

The battery cells 14, in an exemplary embodiment, each include a first end surface 32, a second end surface 34, and a perimeter surface 36. The first end surface 32 and the second end surface 34 are preferably the end surfaces of each battery cell in the vertical direction V (e.g., the non-stacking direction). The perimeter surface 36 includes the surface or surfaces of the battery cells 14 which extend in the lateral direction L (and/or the direction perpendicular to lateral direction L and vertical direction V). In the illustrated embodiment, the battery cells 14 include cylindrical cells. The perimeter surface 36 in this embodiment is the round surface which extends around the side of the battery cells 14.

In an exemplary embodiment, the positive terminal 22 of each battery cell 14 is provided on the first end surface 32. For example, the positive terminal 22 may be a conductive contact surface which is formed and/or exposed at the first end surface 32. While the positive terminal 22 is shown as a circular section of the first end surface 32, it should be understood that other sizes and/or shapes are possible, including the entire first end surface 32 being the positive terminal 22.

In an exemplary embodiment, the negative terminal 24 of each battery cell is provided on the perimeter surface 36. For example, the negative terminal 24 may be a conductive contact surface which is formed and/or exposed at a portion of the perimeter surface 36. The negative terminal 24 may extend around the entire perimeter surface 36 (e.g., 360° around the circumference of a cylindrical battery cell) or at only a portion thereof. In the illustrated embodiment, the negative terminal 24 is a circular band which is located near the first end surface 32 (but spaced therefrom).

The busbar 26 is configured to connect each positive terminal 22 to each other positive terminal 22 and connect each negative terminal 24 to each other negative terminal 24. The busbar 26, in an exemplary embodiment, includes a layered structure including a plurality of layers which are stacked in the vertical direction V. In an exemplary embodiment, the busbar 26 includes a first conductive layer 38, a second conductive layer 40, a first isolating layer 42, a second isolating layer 44, and a third isolating layer 46.

The first and second conductive layers 38, 40 are laterally-extending layers of electrically-conductive material (e.g., metal). The first conductive layer 38 contacts each other positive terminal 22 of the plurality of battery cells 14. The second conductive layer contacts each of the negative terminals 24 of the battery cells 14. In an exemplary embodiment, the first conductive layer 38 is positioned on the first end surfaces 32 of the plurality of battery cells 14, such that an electrical connection is formed at the interface.

The second conductive layer 40 is positioned to make contact with the negative terminals 24. For example, the second conductive layer 40 may be positioned between the first and second end surfaces 32, 34 and at least partially surrounding the perimeter surface 36. In an exemplary embodiment, the second conductive layer 40 is formed with a plurality of openings 48 which receive a respective battery cell 14 therein. In this way, the second conductive layer 40 can extend laterally to contact the negative terminals 24 on the perimeter surfaces 36 of the battery cells 14.

The isolating layers 42, 44, 46 are formed from a non-electrically conductive material (e.g., polymer, foam, etc.) such that the first and second conductive layers 38, 40 are shielded from each other and from contacting other components (i.e., an electrical connection or arc which may cause a short or malfunction is prevented).

The first isolating layer 42 is preferably positioned between the first conductive layer 38 and second conductive layer 40. The second isolating layer 44 is preferably positioned on the first conductive layer 38 on a side of the first conductive layer 38 which is opposite from the first isolating layer 42. The third isolating layer 46 is preferably positioned on the second conductive layer 40 on a side of the second conductive layer 40 which is opposite from the first isolating layer 42.

The isolating layers 42, 44, and 46, in addition to shielding the first and second conductive layers 38 and 40, are configured as a mechanical hold which helps to keep the plurality of battery cells 14 in position relative to each other. Moreover, the connection of the isolating layers 42, 44, and 46 positions the first and second conductive layers 38, 40, such that, in at least some embodiments, additional connection mechanisms (e.g., welding) are not necessary.

According to at least some disclosed embodiments, each of the isolating layers 42, 44, and 46 contributes to holding the plurality of battery cells 14 in position relative to each other in at least the lateral direction L. In an exemplary embodiment, each of the first and third isolating layers 42, 46 include openings 50, 52, respectively, which are configured to receive at least a portion of a respective battery cell 14. With the battery cells 14 positioned in these openings 50, 52, the battery cells 14 are inhibited from separating in the lateral direction. In some embodiments, the openings 50 and/or 52 may be sized to create a frictional fit with the perimeter surface 36 of the battery cells 14. In this way, the first and third isolating layers 42, 46 may additionally hold the plurality of battery cells 14 in position relative to each other in the vertical direction V.

The second isolating layer 44 may be an outer-most layer of the layered busbar 26 and preferably extends over the plurality of battery cells 14 (e.g., by being placed over the first conductive layer 38). The second isolating layer 44 may act as a compressive member which holds the battery cells 14 in both the lateral direction L (e.g., through indirect attachment to each cell though the other layers) and vertical direction V (e.g., through the indirect attachment and/or via the positioning of the second isolating layer 44 on top of the cells).

The layered structure of the busbar 26 preferably includes the various layers being bonded to each other to form a laminate structure. This configuration may help to simplify an assembly process, as the battery cells 14 can easily be mechanically and electrically connected by positioning the busbar 26 on the ends of the cells 14. In other embodiments, one or more of the layers may be placed in contact with each other with or without external means holding the layers together.

FIG. 3 illustrates one exemplary configuration of a battery module 12 including the plurality of battery cells 14 and the busbar 26. In this embodiment, the plurality of battery cells 14 are positioned in the same orientation. For example, each of the first end surfaces 32 are located in the same plane in this configuration. The busbar 26 extends across the plurality of battery cells 14 in the area which includes the first end surfaces 32. In this way, all of the battery cells 14 are connected to each other (both electrically and mechanically) and held together by the layered structure of the busbar 26. This assembly of battery cells 14 and busbar 26 may be used in combination with a battery module housing which receives the assembly and connects the first and second conductive layers 38, 40 to positive and negative module terminals 28, 30, respectively.

Figure 4:
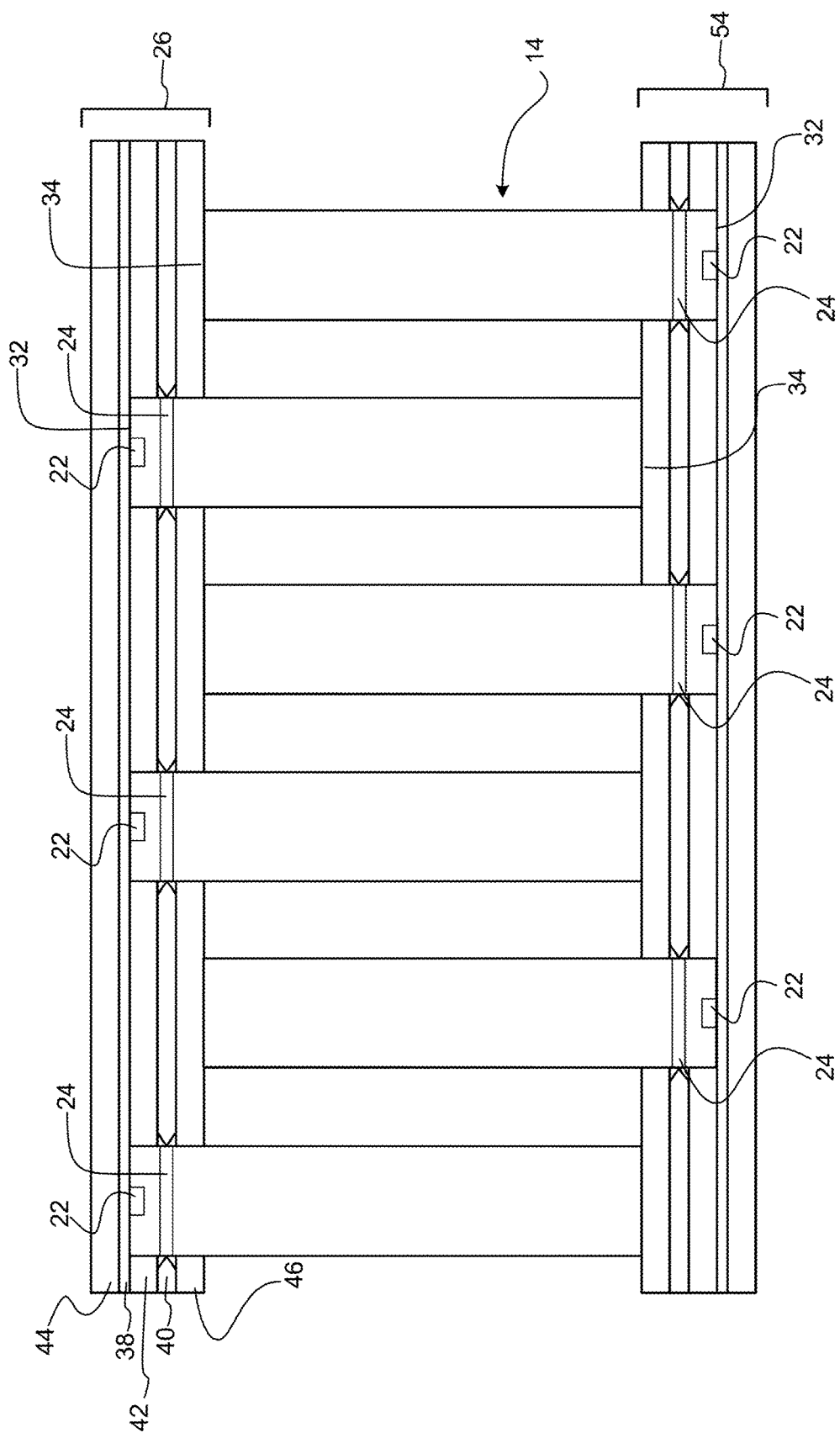
FIG. 4 is a side-view illustration of another configuration of the battery module of FIG. 2.

FIG. 4 illustrates another exemplary configuration of a battery module 12 including the plurality of battery cells 14, the busbar 26, and a second busbar 54. In this configuration, the plurality of battery cells 14 include a first subset 56 of battery cells 14 and a second subset of battery cells 14. The first subset 56 may be oriented opposite from the second subset 58. For example, the battery cells 14 in the second subset 58 may be inverted relative to the battery cells 14 in the first subset such that the first end surfaces 14 of the respective subsets are positioned on opposite sides from each other in the vertical direction V.

According to this embodiment, the busbar 26 interconnects the plurality of battery cells 14 in the first subset 56. In addition, the second busbar 54, which may include the same or similar layered structure to that of the busbar 26, interconnects the plurality of battery cells 14 in the second subset 58. Even though they are separately connected, the battery cells 14 in the first and second subsets 56, 58 are positioned with each other (e.g., intermixed). In an exemplary embodiment, the battery cells 14 which are part of the first subset 56 are alternated with battery cells 14 which are part of the second subset 58 in the lateral direction L.

Moreover, as shown in FIG. 4, the battery module 12 may be further configured such that the second end surfaces 34 of the cells 14 are positioned on the third isolating layer 46 of the opposing busbar. This configuration carefully intertwines the battery cells 14 and provides support on all sides in the lateral and vertical directions. The battery module components illustrated in FIG. 4 may be further combined with a battery module housing and/or other components to form the battery module 12.

Figure 5:
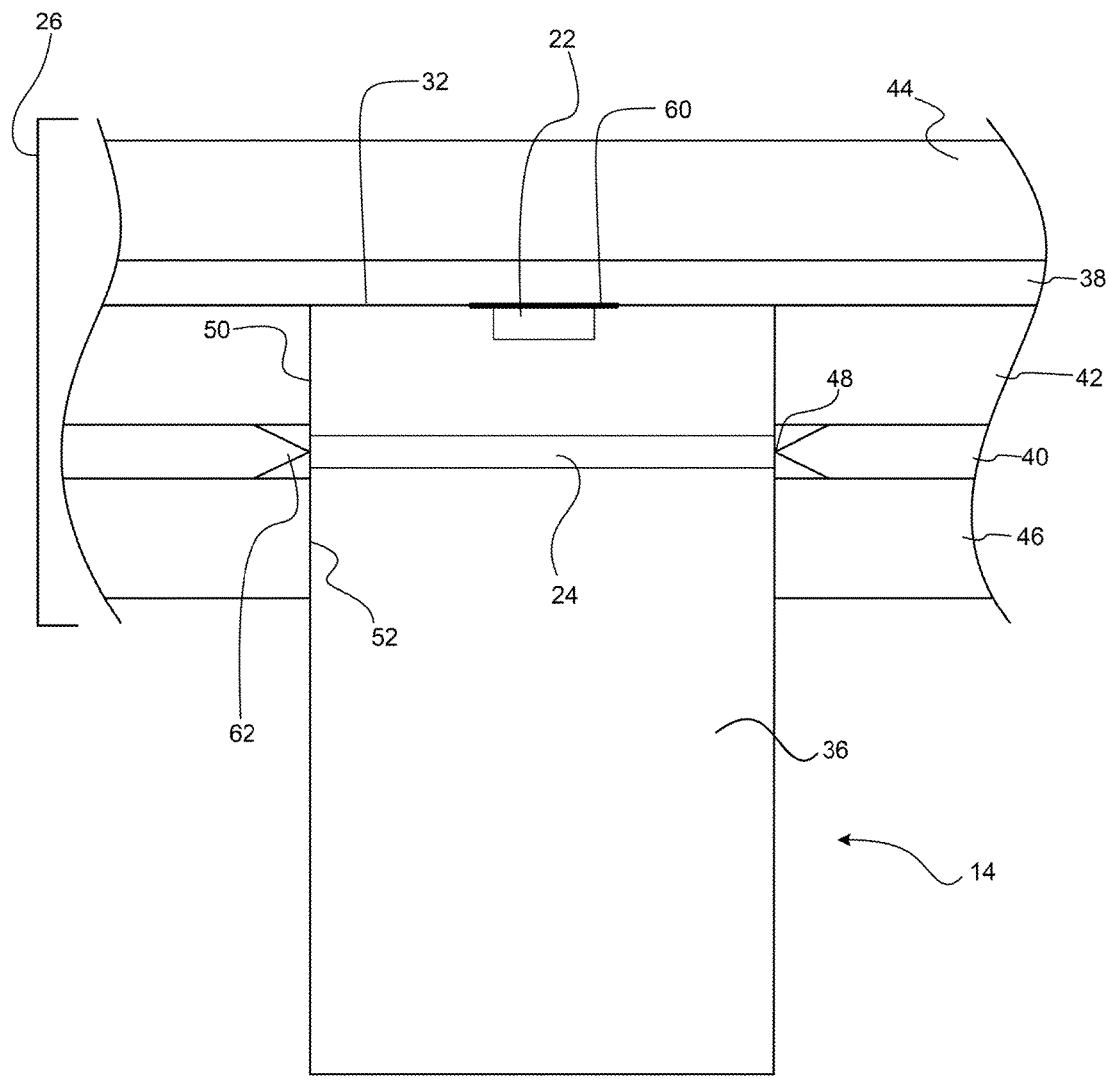
FIG. 5 is an enlarged view of a busbar connection according to disclosed embodiments.

FIG. 5 is an enlarged view further illustrating the interface between a battery cell 14 and the busbar 26 (or busbar 54). The layered structure of the busbar 26 receives the end of the battery cell 14 (e.g., via openings 48, 50, 52) such that the first isolating layer 42, second conductive layer 40, and third isolating layer 46 at least partially surround the battery cell 14. For example, these layers surround a portion of the perimeter surface 36 adjacent to the first end surface 32. The first conductive layer 38 and the second isolating layer 44 are positioned on the first end surface 32 of the battery cell 40.

In an exemplary embodiment, the first and second conductive layers 38, 40 include additional features which facilitate the connection to the positive and negative terminals 22, 24, respectively. For example, the first conductive layer 38 is preferably connected to the first end surface by an electrically conductive adhesive 60. The electrically conductive adhesive 60 maintains contact between the first conductive layer 38 and the positive terminal 22 and helps to keep the layered structure of the busbar 26 in attachment with the plurality of battery cells 14.

The second conductive layer 40 further includes a contacting point surface 62 which contacts with the negative terminal 24 of the battery cell 14. The contacting point surface 62 is preferably a thin portion of the second conductive layer 40. For example, the second conductive layer 40 may include a portion which transitions into the contacting point surface 62 from a greater-thickness main body portion of the second conductive layer 40. The contacting point surface 62 is preferably sized to burn away when a threshold amount of current is present at the negative terminal 24. In this way, the contacting point surface 62 forms a fusible link which breaks when an amperage present at the connection point is above an acceptable level. This interrupts the electrical connection with the battery cell 14, which may be necessary under certain conditions (e.g., an abnormally high amount of current being directed to or from the battery cell).

In an exemplary embodiment, at least one of the openings 50, 52 in the first and third isolating layers 42, 46 are sized to prevent the negative terminals 24 from contacting the second conductive layer 40 after the contacting point surface 62 has burned away. For example, the openings 50 may be sized such that only a small clearance, if any, is formed between the first isolating layer 42 and the perimeter surface 36 of the battery cell. In this way, when the contacting point surface 62 is burned away, resulting in the negative terminal 24 being taken out of contact with the second conductive layer 40, the gap between the negative terminal 24 and second conductive layer 40 is maintained due to the holding of the battery cell 14 in the opening 50.

The disclosed busbar is applicable to connecting battery cells and is particularly applicable to connecting many battery cells in a battery module of an electric vehicle. The layered structure of the busbar presents a one-piece construction which allows for simple mechanical and electrical connection of many battery cells.

In an exemplary method of manufacturing a battery module, the disclosed busbar may be separately formed as a one-piece structure, including the disclosed conductive and isolating layers. Several of the layers, such as the first isolating layer, second conductive layer, and third isolating layer, may form a receiving space (e.g., via the aligned openings therein) for receiving the ends of the battery cells. The battery cells may be inserted into the receiving spaces until the first end surface contacts the electrically conductive adhesive. This adhesive, in addition to any frictional forces in the openings, may be sufficient to retain the battery cells in contact with the busbar. The battery cells may be aligned and inserted simultaneously or individually connected. The resulting battery module includes the busbar connection which provides the several advantages described herein, including the simple and efficient mechanical and electrical interconnection of the battery cells, as well as the integrated fusible link which interrupts the electrical connection under certain conditions. The busbar provides these features without the use of welding and other similar connection means, thereby avoiding the manufacturing steps associated with those types of batteries.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A battery module, comprising:
    a plurality of battery cells each configured to store an electric charge, each battery cell including a first end surface, a second end surface, a perimeter surface, a positive terminal and a negative terminal;
    a busbar interconnecting the plurality of battery cells, wherein the busbar includes a layered structure comprising a plurality of parallel-extending layers, including:
        a first conductive layer contacting each of the positive terminals of the plurality of battery cells;
        a second conductive layer contacting each of the negative terminals of the plurality of battery cells; and at least one isolating layer connected to each of the plurality of battery cells and holding the plurality of battery cells in position relative to each other in at least a lateral direction.

2. The battery module of claim 1, wherein the at least one isolating layer includes a first isolating layer positioned between the first conductive layer and the second conductive layer.

3. The battery module of claim 2, wherein the first isolating layer includes a plurality of openings each receiving a respective one of the plurality of battery cells.

4. The battery module of claim 3, wherein first end surfaces of the plurality of battery cells include the positive terminals and the first conductive layer is positioned on the first end surfaces of the plurality of battery cells.

5. The battery module of claim 4, wherein the at least one isolating layer further includes a second isolating layer, the second isolating layer being positioned on the first conductive layer on a side of the first conductive layer opposite from the first isolating layer, the second isolating layer holding the plurality of battery cells in the lateral direction and a vertical direction.

6. The battery module of claim 5, wherein the at least one isolating layer further includes a third isolating layer, the third isolating layer being positioned on the second conductive layer on a side of the second conductive layer opposite from the first isolating layer.

7. The battery module of claim 3, wherein the perimeter surfaces of the plurality of battery cells include the negative terminals and the second conductive layer is positioned between the first and second end surfaces and at least partially surrounds the perimeter surface.

8. The battery module of claim 7, wherein the second conductive layer contacts the negative terminals via a contacting point surface which is configured to burn away when a threshold amount of current is present at the negative terminal.

9. The battery module of claim 8, wherein the plurality of openings are sized to prevent the negative terminals from contacting the second conductive layer after the contacting point surface has burned away.

10. A battery module, comprising:
a plurality of battery cells each configured to store an electric charge, each battery cell including a first end surface including a positive terminal, a second end surface, and a perimeter surface including a negative terminal;
a busbar interconnecting the plurality of battery cells, wherein the busbar includes a layered structure comprising a plurality of parallel-extending layers, including:
a first conductive layer positioned on the first end surface of the plurality of battery cells and contacting each of the positive terminals of the plurality of battery cells;
a second conductive layer positioned between the first and second end surfaces and at least partially surrounds the perimeter surface and contacting each of the negative terminals of the plurality of battery cells; and
at least one isolating layer positioned between the first conductive layer and the second conductive layer.

11. The battery module of claim 10, wherein the first conductive layer is attached to the first end surfaces by an electrically conductive adhesive.

12. The battery module of claim 10, wherein the second conductive layer contacts the negative terminals via a contacting point surface which is configured to burn away when a threshold amount of current is present at the negative terminal.

13. The battery module of claim 12, wherein the second conductive layer includes a portion which transitions into the contacting point surface from a portion which has a greater thickness.

14. The battery module of claim 12, wherein the contacting point surface contacts the negative terminal around an entire perimeter of the battery cell.

15. The battery module of claim 10, wherein the busbar is a first busbar which interconnects a first subset of the plurality of battery cells and further including a second busbar which interconnects a second subset of the plurality of battery cells, wherein the battery cells in the first subset are positioned with the battery cells in the second subset.

16. The battery module of claim 15, wherein the battery cells in the second subset are inverted relative to the battery cells in the first subset.

17. The battery module of claim 10, wherein the plurality of battery cells are cylindrical cells.

18. The battery module of claim 17, wherein the second conductive layer is in contact with 360° of the perimeter surface.

19. The battery module of claim 10, further comprising a battery management system operably connected to the busbar.

20. A busbar configured to mechanically and electrically connect a plurality of battery cells which each include a first end surface including a positive terminal, a second end surface, and a perimeter surface including a negative terminal, the busbar comprising a layered structure, including
first conductive layer configured to be positioned on the first end surfaces of and contact the positive terminals via an electrically-conductive adhesive;
a second conductive layer configured to at least partially surround the perimeter surfaces and contacting each of the negative terminals of the plurality of battery cells via a contacting point surface which is configured to burn away when a threshold amount of current is present at the negative terminal;
a first isolating layer positioned between the first conductive layer and the second conductive layer;
a second isolating layer positioned on a side of the first conductive layer opposite the first isolating layer; and
a third isolating layer positioned on a side of the second conductive layer opposite the first conductive layer,
wherein the first isolating layer, the second isolating layer, and the third isolating layer shield the first and second conductive layers and are configured to hold the plurality of battery cells in position relative to each other in a lateral and vertical direction.

* * * * *

UNITED STATES PATENT AND TRADEMARK OFFICE
CERTIFICATE OF CORRECTION

PATENT NO. : 10,074,846 B2
APPLICATION NO. : 15/394935
DATED : September 11, 2018
INVENTOR(S) : Austin L. Newman Page 1 of 1

It is certified that error appears in the above-identified patent and that said Letters Patent is hereby corrected as shown below:

On the Title Page

Item (72), replace "Austin Newman" with --Austin L. Newman--.

Signed and Sealed this
Fifth Day of March, 2019

Andrei Iancu
*Director of the United States Patent and Trademark Office*